Figure 1:
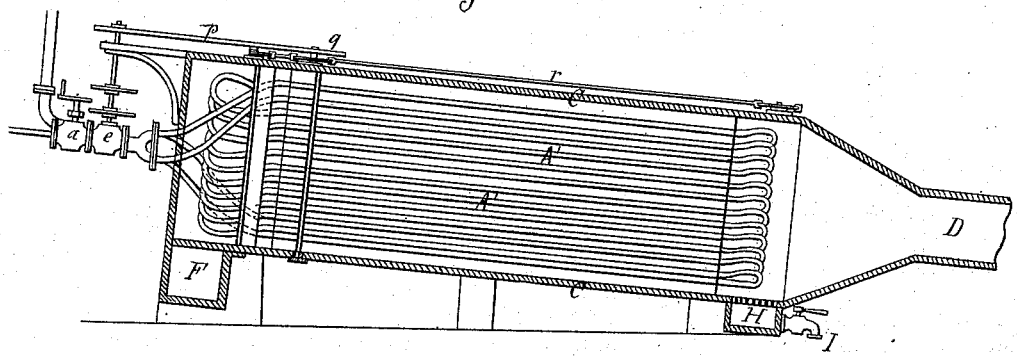

(No Model.)

E. FIXARY.
APPARATUS FOR FREEZING LIQUIDS.

No. 330,884. Patented Nov. 24, 1885.

WITNESSES:
E. B. Bolton
Geo. Bainton

INVENTOR:
Edouard Fixary
by his attys.
Burke, Fraser & Connett

UNITED STATES PATENT OFFICE.

EDOUARD FIXARY, OF PARIS, FRANCE.

APPARATUS FOR FREEZING LIQUIDS.

SPECIFICATION forming part of Letters Patent No. 330,884, dated November 24, 1885.

Application filed July 10, 1885. Serial No. 171,203. (No model.) Patented in France August 23, 1884, No. 163,920.

*To all whom it may concern:*

Be it known that I, EDOUARD FIXARY, a citizen of the French Republic, and a resident of Paris, France, have invented an improved physical means or apparatus for cooling air and extracting the moisture therefrom by alternately freezing and thawing the vapor held in suspension by the air, (which invention has been patented to me in France by Letters Patent dated August 23, 1884, No. 163,920,) of which the following is a specification.

In the employment of refrigerating-machines which lower the temperature through the detention and vaporization of volatile liquids it is well known that the yield of such machines depends in part on the regulating-cock, which has for its function the limitation of the detention and vaporization of the volatile liquid on the surfaces arranged for the refrigeration of other bodies or substances submitted to contact therewith, whether the apparatus is of the kind known as the "Carré" or that which is operated by double-acting pumps. By reason of this fact I establish as a principle that we can, by any means whatever, arrest the vaporization and the exhaust or production of a vacuum in one part of the apparatus used, and continue simultaneously or alternately and at will the vaporization and the formation of a vacuum in the other part of the apparatus, or of several connecting apparatuses, without interfering with the regular functions of the refrigerating-machine and without interfering with the circulation and the refrigeration of the air. Following this principle of operation, we may obtain a very low temperature and intense cold in the part of the apparatus where the vaporization and the exhaust or production of a vacuum are still going on, while in the other part, where this action is arrested momentarily, the temperature will be raised and a great difference of temperature between the two parts of the apparatus will be instantly established—that is to say, congelation of the moisture in the atmosphere will be going on in one part of the apparatus simultaneously with thawing in the other part and in a continuous manner, since in the part or section having the lowest temperature the air yields up its moisture in the form of frost, and this frost melts as soon as the temperature rises above the freezing-point, due to the cessation of the vaporization of the volatile liquid. This arrest of the vaporization is effected alternately in the two parts of the apparatus, and kept up continuously and indefinitely in such a manner as to create with the surrounding air a continuous source of fresh cool water, and at the same time a lowering of the temperature in the apartment sufficient to prevent fermentation or decomposition of perishable substances which require to be kept at a low temperature for their preservation. It is well known that the higher the temperature of the air the more vapor of water it will hold in suspension, and from this fact it results we are able to distill or condense a certain quantity of pure water, and establish a temperate climate on board of vessels, even in the tropics.

I have ascertained from numerous experiments that the air at a medium temperature of $+ 8°$ centigrade yields regularly two and one-half liters of water per eighteen hundred cubic meters of air when passed through an air-cooling apparatus with a capacity equivalent to ten thousand calories or one hundred kilograms of ice; and as at $+ 30°$ centigrade the air contains nearly four times as much vapor, we may obtain easily ten liters of potable water in the same time with an apparatus of like capacity, and the air cooled in this way may be distributed through all the chambers of a vessel in order to render them inhabitable and comfortable even in the hottest climates. If we act on one or more rooms or chambers containing fermentable or decomposable bodies, it is best to prevent as far as possible the entry of air from without in order to lessen the work of refrigeration—that is to say, we may act continuously on the same body of air, but in this case the water resulting from the melting of the frost will not be potable, and in consequence will only serve for special uses. A simple ventilator will suffice to establish the circulation; but when we desire it to act so as to make the water potable, and to establish a constantly renewed current of fresh air in the inclosure or room, we should isolate the extremity of the apparatus whereat the warm air is taken, so as to establish this air-inlet in the atmosphere surrounding, and in this case it communicates only with the chamber to be cooled on the opposite side—that is to say, on the side for the delivery of cool air. We may obtain these results in different ways, one among others being by the maneuvering of several-way cocks, arranged one between the cock for regulating the volatile liquid and the vaporization surfaces on the one side, and on the other side one between the said vaporization-surfaces and the suction or compression pumps, or their equivalents, in refrigerating-machines, this maneuvering having for its object to arrest the vaporization of the volatile liquid and prevent the formation of a vacuum in one part of the apparatus, and for continuing simultaneously, alternately, and at will the vaporization and formation of a vacuum in another part of the apparatus without suspending the continuous and regular production from the warm air of sweet water and cold dry air. We can likewise utilize the regulating-cock in a double sense, and make it render the services mentioned above; but these services are of such a delicate character that it is preferable to add the several-way cocks or their equivalents. Now that, by the aid of the auxiliary cocks, I can obtain at will sudden changes of temperature in different parts of one apparatus or of several communicating apparatuses—that is to say, I can produce frost or ice on the one side and simultaneously melt frost or ice on the other side—the apparatus must act to prevent the water arising from the melting of the frost or ice from re-entering into the circulation of the air. This result I realize, for example, by the arrangement which forms the object of this application, and which is shown in the accompanying drawings, in which—

Figure 2:
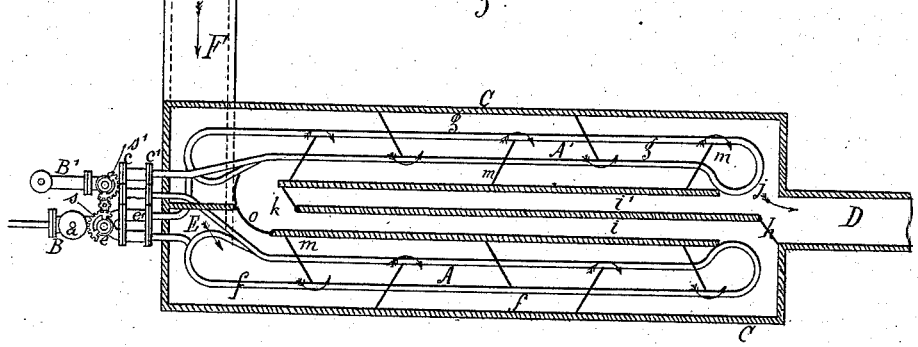
Figure 3:
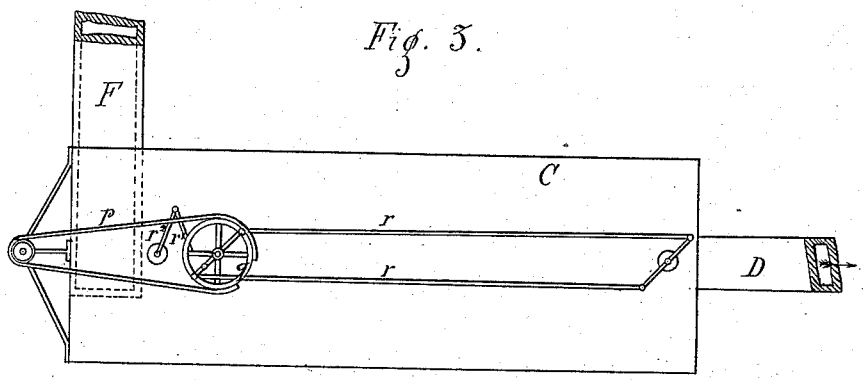

Figure 1 is a longitudinal vertical section of my apparatus. Fig. 2 is a longitudinal horizontal section. Fig. 3 is a plan view.

A double series of pipes, A A', end, respectively, in collectors B B', and are connected together on one side by a cock, a, for regulating the volatile liquid, and on the other side to the suction of the exhaust and compression pump, or its equivalent, through the auxiliary cocks. These pipes A A', in which the vaporization of the volatile liquid is effected, are arranged in a casing, C, which is made as tight as possible in order to isolate its interior from the surrounding air. This casing communicates at its lower extremity, D, with the chambers to be kept at a low temperature, and at its other extremity with the inlet-pipe F, whereat the warm air enters. The compartments $f\, g$, containing the pipes or refrigerating-surfaces on which the frost is produced and melted alternately, and whereto the ventilator admits the warm air in equal quantities, are furnished with deflecting-diaphragms $m\, m$, and are provided at their bottoms with longitudinally-arranged grooves, which permit the water to flow readily when the frost melts. Each of these grooves is terminated by a hole leading into a receptacle, H, arranged at the lower end of the inclosing-casing C, and below the latter. This receptacle or drip-chamber is furnished with a cock, I, to draw off the water that collects in it. The volatile liquid, furnished in a continuous manner by any kind of refrigerating-machine, passes through the regulating-cock $a$, through the auxiliary cock $e$, the tubes A A', and the regulating-cock $c$ in quantity sufficient to act on all the refrigerating-surfaces at the same time, if we wish it to do so, as now practiced in continuous refrigerating apparatuses. Now, for effecting the cooling of air and the separation therefrom in a liquid form of the watery vapor held in suspension, the refrigerating-machine and my "changer" (as I call my apparatus) are set in operation. Then the regulating-cock $a$ is opened, and the auxiliary cocks $c\, e$ also, in such a manner as to distribute the gas for lowering the temperature over all the surfaces of the apparatus at the same time. After the frost has formed on all the refrigerating pipes or surfaces A A', which may be ascertained by its formation on the exterior branches of same, the vaporization is arrested in one set of pipes A or A' for some minutes, and allowed to go on in the other set. The frost now melts on the former set and yields water, which flows off at H. The vaporization may now be re-established in this set of pipes and arrested in the other set, when the same phenomenon appears there. This change is effected by rotating the auxiliary cocks $c\, e$, at the same time opening and closing certain traps, $k\, h\, o$, arranged in the casing C—that is to say, during the arrest of vaporization on the one side of the changer the air-opening is closed on this side, in order to arrest or deflect the current of air which has melted the frost and force the water resulting therefrom to flow along the grooves into the drip-chamber H. On the other side the adjacent air-opening is opened at the same time that the preceding is closed, and permits the dry cool air to enter the rooms to be cooled. A few moments after the frost is melted on one side, which it does very quickly, the operation is reversed by changing the direction of the refrigerating-gas and the currents of air, and this movement may be effected constantly, and regulated at will until the air has been sufficiently cooled to prevent or regulate the fermentation of substances and materials on which it acts, or until a suitable temperature has been reached and enough fresh water obtained. Thus, for example, in the drawings we see on the side where the warm air enters the wheels for actuating the auxiliary cocks $c\, e$, arranged in such a way as to actuate simultaneously the cocks $c\, e$ and the traps $k\, h\, o$ by the application of a cord or strap, $p$, on a wheel, $q$, and rods $r\, r\, r'\, r^2$, and toothed sectors $s\, s'$. In the drawings we will suppose the cock $a$ open, establishing communication with the pipes A' by the tube $e'$, and the vapor of the refrigerating-liquid passing out by pipe $c'$ and cock $c$, while the cocks *e* and *c* shut off all communication with pipes A. The result is that the vaporization is arrested in the refrigerating-pipes on the side *f* of the changer while this action continues on the side *g*. During the maneuver the trap *h* is closed on the side *f* and forces the warm air which has melted the frost to return by the channel *i* over the refrigerating-surfaces submitted to the vaporization on the side *g* of the changer, where it is dried and cooled, before the entry into the chamber to be cooled, by way of the passage *j*, which remains open, and the outlet D. The opposite maneuver—that is to say, the change of direction of the air-currents and of the volatile refrigerant—is effected at short intervals by the reversing of the auxiliary cocks *c e* and the traps *k h o*, which effects the congelation and thaw in the apparatus, and also the continuous separation of the vapor of water held in suspension by the air. This change of direction of the currents of air by the trap *h* is accompanied by movements of the traps *k o*, applied each to one of the exterior partitions of the conduits *i i*.

I claim as my invention—

1. The suspension or arrest momentarily of the vacuum and the vaporization of the volatile liquid, by any suitable means, in a part of the apparatus, while the vacuum and vaporization are continued in the other part of the said apparatus, or of several communicating apparatuses, in order to obtain sudden changes of temperature alternately, simultaneously, and at will without arresting the regular action of the refrigerating apparatus or the continuous cooling of the air, as set forth.

2. The combination of cocks and traps which serve to prevent the vacuum and the vaporization of the volatile liquid, and to direct the air-currents furnished to the apparatus in such a manner as to accelerate the melting of the frost on one side and the cooling and drying of the air on the other side before its entry into the room to be cooled, as set forth.

3. The separation of the vapor of water in a liquid form, accruing from the melting of the frost or ice, coincident with the arrest of the vacuum and the vaporization, in one part of the apparatus, and the forced flowing of the water without the current of air, as set forth.

In witness whereof I have hereunto signed my name in the presence of two subscribing witnesses.

EDOUARD FIXARY.

Witnesses:
ROBT. M. HOOPER,
AMAND RITTER.